United States Patent
Ishikawa

(10) Patent No.: US 9,534,681 B2
(45) Date of Patent: Jan. 3, 2017

(54) WAVE GEAR DEVICE HAVING TAPERED FLEXIBLE EXTERNAL GEAR

(75) Inventor: Shoichi Ishikawa, Yokohama (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 386 days.

(21) Appl. No.: 14/348,298

(22) PCT Filed: Sep. 29, 2011

(86) PCT No.: PCT/JP2011/005521
§ 371 (c)(1),
(2), (4) Date: Mar. 28, 2014

(87) PCT Pub. No.: WO2013/046274
PCT Pub. Date: Apr. 4, 2013

(65) Prior Publication Data
US 2014/0251048 A1    Sep. 11, 2014

(51) Int. Cl.
*F16H 49/00* (2006.01)
*F16H 55/08* (2006.01)

(52) U.S. Cl.
CPC ........ *F16H 49/001* (2013.01); *F16H 55/0833* (2013.01); *F16H 2049/003* (2013.01); *Y10T 74/19647* (2015.01)

(58) Field of Classification Search
CPC ............... F16H 49/001; F16H 55/0833; F16H 2049/003; F16H 2055/0866; Y10T 74/19; Y10T 74/19642; Y10T 74/19972; Y10T 74/19967; Y10T 74/19633

(Continued)

(56) References Cited

U.S. PATENT DOCUMENTS

| 2,906,143 A | 9/1959 | Musser |
| 5,918,508 A * | 7/1999 | Ishikawa ............. F16H 55/0833 |
| | | 475/180 |

(Continued)

FOREIGN PATENT DOCUMENTS

| JP | 45-41171 S | 12/1970 |
| JP | 63-115943 A | 5/1988 |

(Continued)

OTHER PUBLICATIONS

International Search Report (PCT/ISA/210) mailed on Dec. 13, 2011, by the Japanese Patent Office as the International Searching Authority for International Application No. PCT/JP2011/005521.

*Primary Examiner* — Victor MacArthur
*Assistant Examiner* — Leonard J Archuleta
(74) *Attorney, Agent, or Firm* — Buchanan Ingersoll & Rooney PC

(57) ABSTRACT

With a wave gear device, the gears employ homothetic curve tooth profiles AD, BE. Furthermore, a transposition is applied to the external teeth along the tooth trace such that the movement loci $M_2$, $M_3$ of the external teeth in a section perpendicular to the axis, from the aperture end to the inner end, share the movement locus $M_1$ of the aperture end and bottom portion thereof, and a continuous meshing of the teeth in the tooth trace direction is achieved. Furthermore, the tooth bottom rim thickness of the aperture end of the external teeth is optimized using a modified Goodman diagram, and a tooth bottom rim thickness which takes into account the relationship between the tooth profile and the transmitted torque from the aperture end to the inner end is employed for the flexible external gear.

4 Claims, 11 Drawing Sheets

(58) Field of Classification Search
USPC ...... 74/411, 640, 412 R, 433, 437, 438, 457, 74/460, 461, 462; 475/180, 904; 29/893, 29/893.3
See application file for complete search history.

(56) References Cited

U.S. PATENT DOCUMENTS

| | | | |
|---|---|---|---|
| 6,167,783 B1* | 1/2001 | Ishikawa | F16H 55/0833 74/457 |
| 7,694,607 B2* | 4/2010 | Ishikawa | F16H 55/0833 74/462 |
| 2007/0180947 A1 | 8/2007 | Ishikawa et al. | |
| 2010/0212446 A1* | 8/2010 | Zhang | F16H 49/001 74/461 |
| 2010/0319484 A1* | 12/2010 | Kanai | F16H 55/0833 74/640 |
| 2011/0237382 A1* | 9/2011 | Ishikawa | F16H 55/0833 475/180 |
| 2012/0285283 A1* | 11/2012 | Ishikawa | F16H 55/0833 74/461 |
| 2012/0304791 A1* | 12/2012 | Ishikawa | F16H 49/001 74/412 R |
| 2013/0081496 A1* | 4/2013 | Ishikawa | F16H 1/10 74/412 R |
| 2014/0224050 A1* | 8/2014 | Hofmann | F16H 49/001 74/412 R |
| 2014/0345406 A1* | 11/2014 | Ishikawa | F16H 49/001 74/412 R |

FOREIGN PATENT DOCUMENTS

| | | |
|---|---|---|
| JP | 64-079448 A | 3/1989 |
| JP | 2001-234988 A | 8/2001 |
| JP | 2007-211907 A | 8/2007 |
| JP | 2011-144916 A | 7/2011 |
| WO | WO 2010/023710 A1 | 3/2010 |
| WO | WO 2010/070712 A1 | 6/2010 |

* cited by examiner

WAVE GEAR DEVICE HAVING TAPERED FLEXIBLE EXTERNAL GEAR

TECHNICAL FIELD

The present invention relates to a wave gear device having a tapered flexible external gear furnished with a tooth profile capable of continuous meshing over a wide range in the tooth trace direction. In more detail, the present invention relates to a wave gear device having a tapered flexible external gear, whereby maximization of transmission load torque is possible through optimization of the rim thickness established in the flexible external gear.

BACKGROUND ART

Since the invention of the wave gear device by C. W. Musser (Patent Document 1) up to the present day, inventions for devices of various types have been conceived by its originator, as well as by numerous researchers, including the present inventor. Even limiting the discussion to inventions relating to the tooth profile, numerous different types have been proposed. For example, in Patent Document 2, the present inventor proposed using an involute tooth profile as a basic tooth profile; and in Patent Documents 3 and 4 proposed a tooth profile design method employing a procedure for approximating, by means of a rack, meshing of the teeth of a rigid internal gear and a flexible external gear of a wave gear device, to derive an addendum tooth profile that affords contact of the two gears over a wide area.

Typically, a wave gear device has a ring-shaped rigid internal gear, a flexible external gear disposed coaxially to the inside thereof, and a wave generator fitting inside thereof. The flexible external gear is provided with a flexible cylindrical barrel portion, a diaphragm radially extending from the rear end of this cylindrical barrel portion, and external teeth formed on the outside peripheral face section of the cylindrical barrel portion at the front end opening side thereof. The flexible external gear is flexed into ellipsoidal shape by the wave generator, and meshes with the rigid internal gear at both ends in the major axis direction of the ellipse.

The external teeth of the flexible external gear flexed into ellipsoidal shape have an increasing amount of flexure, proportional to the distance from the diaphragm, from the diaphragm side towards the front end opening along the tooth trace direction thereof. Moreover, sections of the tooth portion of the flexible external gear undergo repeated flexure in radial directions in association with rotation of the wave generator. However, to date, sufficient consideration has not been given to a rational method for establishing a tooth profile in a manner that takes into consideration such flexural action (coning) of the flexible external gear by the wave generator.

In Patent Document 5, the present inventor proposed a wave gear device provided with a tooth profile by which continuous meshing is possible, with consideration given to coning of the teeth. In the device proposed in Patent Document 5, an arbitrary axis-perpendicular cross section location in the tooth trace direction of the flexible external gear is selected as a principal cross section, and at a major axis position in an ellipsoidal rim neutral line of the flexible external gear in the principal cross section, an amount of flexure 2 κmn (where κ is the flexural coefficient, m is the module, and n is a positive integer) with respect to a rim neutral circle prior to flexure is established in such a way as to flex to a standard-deflection state of 2 mn (κ=1).

Additionally, using rack meshing to approximate meshing of the flexible external gear and the rigid internal gear, in axis-perpendicular cross sections at locations including the principal cross section in the tooth trace direction of the flexible external gear, movement loci of the teeth of the flexible external gear with respect to the teeth of the rigid internal gear in association with rotation of the wave generator are derived; a first homothetic curve BC is derived by scaling down, by a ratio λ (λ<1) while employing a point B as the homothetic center, a curve segment extending from a point A of an apical portion to the point B in the next bottom portion in a movement locus of a standard deflection obtained in the principal cross section, and this first homothetic curve BC is adopted as the basic tooth profile for the addendum of the rigid internal gear.

Furthermore, a second homothetic curve is derived by scaling, by a ratio (1−λ)/λ while employing an end point C of the first homothetic curve BC as the homothetic center, of a curve obtained by 180 degree rotation of the first homothetic curve BC about a center at the point C, and this second homothetic curve is adopted as the basic tooth profile for the addendum of the flexible external gear.

In addition to this, a transposition is applied to tooth profile sections to both sides, in the tooth trace direction, from the principal cross section in the tooth profile of the flexible external gear, doing so in such a way that both negative deflecting-side movement loci obtained in axis-perpendicular cross sections flexed to a negative deflection state (flexural coefficient λ<1) to the diaphragm side from the principal cross section in the external teeth of the flexible external gear, and positive deflection-side movement loci obtained in axis-perpendicular cross sections flexed to a positive deflection state (flexural coefficient λ>1) to the opening side from the principal cross section, describe curves that contact the bottom part of the standard-deflecting movement locus in the principal cross section. The resultant flexible external gear is a tapered flexible gear having an addendum circle of progressively smaller diameter from the opening side towards the diaphragm side in the tooth trace direction.

With a wave gear device in which such a tooth profile has been formed, centering on continuous meshing of tooth profile over a wide range in the principal cross section, effective meshing can be achieved in a tooth trace range extending to the opening end from the principal cross section, and in a tooth trace range extending to the diaphragm side from the principal cross section. Therefore, greater torque can be transmitted, as compared with a conventional wave gear device in which meshing takes place over a narrow tooth trace range.

PRIOR ART DOCUMENTS

Patent Documents

[Patent Document 1] U.S. Pat. No. 2,906,143
[Patent Document 2] JP-B 45-41171
[Patent Document 3] JP-A 63-115943
[Patent Document 4] JP-A 64-79448
[Patent Document 5] WO 2010/070712

DISCLOSURE OF THE INVENTION

Problems to be Solved by the Invention

Prior inventions relating to tooth profiles of wave gear devices were made in independently in a manner unrelated to the rim thickness of the flexible external gear. Specifically, no consideration whatsoever was given to the relationship between tooth profile, and root rim thickness of the flexible external gear which is related to transmission load torque.

Even when a tooth profile that takes coning of the flexible external gear into consideration, making continuous meshing possible, is established such that increased transmission load torque becomes possible, the result is that the transmission load torque of the flexible external gear cannot be increased, unless there is provided root rim thickness such that transmission of the increased transmission load torque is possible. In cases of a shifted tooth profile in which addendum modifications involving different amounts are applied along the tooth trace direction with consideration to coning of the external teeth, it is necessary to establish an appropriate root rim thickness according to the tooth profile (amount of addendum modification) at each location in the tooth trace direction, in order to make possible an increase in the transmission load torque.

With the foregoing in view, it is an object of the present invention to make possible increase in transmission load torque, through optimized establishment of rim thickness of a flexible external gear for a wave gear device having a tapered flexible external gear capable of continuous meshing over a wide range in the tooth trace direction.

Means Used to Solve the Problems

In order to achieve the aforementioned object, in the wave gear device of the present invention, the tooth profiles of both gears and the external tooth rim thickness are established according to the procedure of (1) to (6) below.

(1) Designating an axis-perpendicular cross section at an opening end location in the tooth trace direction of the external teeth of a flexible external gear, as a standard-deflecting principal cross section having a flexural coefficient $\kappa=1$, and deriving respective homothetic curve tooth profiles to be employed for specifying addendum tooth profiles of the teeth of both gears, from movement loci of the external teeth of the flexible external gear with respect to the internal teeth of the rigid internal gear in the principal cross section in question.

(2) Employing, as the tooth profile of the principal cross section at the opening end location of the external teeth of the flexible external gear, a composite tooth profile specified by the addendum profile specified in the aforedescribed manner, a linear tooth profile connected thereto, and an appropriate dedendum tooth profile that avoids interference.

(3) Employing, as the tooth profile for the internal teeth of the rigid internal gear, a composite tooth profile specified by the addendum profile specified in the aforedescribed manner, a linear tooth profile connected thereto, and an appropriate dedendum tooth profile that avoids interference.

(4) In consideration of coning of the flexible external gear, adopting as the tooth profile in cross sections other than the opening end in the tooth trace direction of the external teeth of the flexible external gear, a shifted tooth profile in which a tooth profile shifting is applied to the composite tooth profile adopted as the tooth profile of the principal cross section at the opening end location. In other words, a tooth profile shifting is applied to the tooth profile of the principal cross section, in such a way that relative movement loci with respect to the internal teeth of the rigid internal gear obtained in cross sections in the tooth trace direction of the external teeth of the flexible external gear share the bottom portion thereof with the movement locus of the principal cross section of the opening end location of the external teeth, whereby continuous meshing of both gears over a wide range in the tooth trace direction is achieved.

(5) A modified Goodman diagram is employed to establish optimal root rim thickness at the opening end location in the tooth trace direction of the external teeth of the flexible external gear.

(6) In consideration of the tooth profile and the transmitted torque, a modified Goodman diagram is employed to establish (on the basis of the optimal root rim thickness at the opening end location) the root rim thickness at locations other than the opening end in the tooth trace direction of the external teeth.

Effect of the Invention

According to the present invention, there is provided a wave gear device capable of continuous meshing, provided with a tapered flexible external gear with which continuous meshing is achieved over a wide range in the principal cross section of an opening end location of the external teeth, as well as achieving meshing over a wide range in the tooth trace direction, wherein the root rim thickness of the flexible external gear, which had been given no consideration whatsoever in the prior art, can be established at optimal thickness at each location in the tooth trace direction, so as to be commensurate with the transmission load torque. Therefore, according to the present invention, it is possible to greatly improve the transmission load torque of a flexible external gear of a wave gear device, as compared with the prior art.

MODE FOR CARRYING OUT THE INVENTION

A wave gear device in which the present invention is applied will be described below, making reference to the drawings.

(Constitution of Wave Gear Device)

Figure 1:
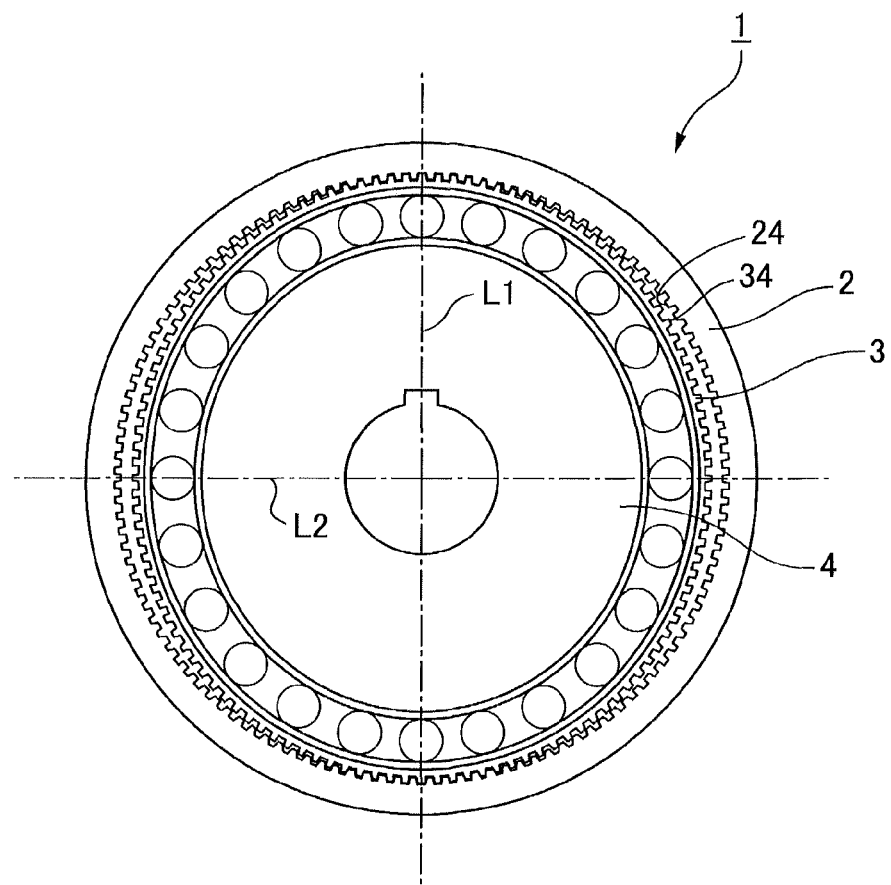
FIG. 1 is a schematic front view of a typical wave gear device.
Figure 2:
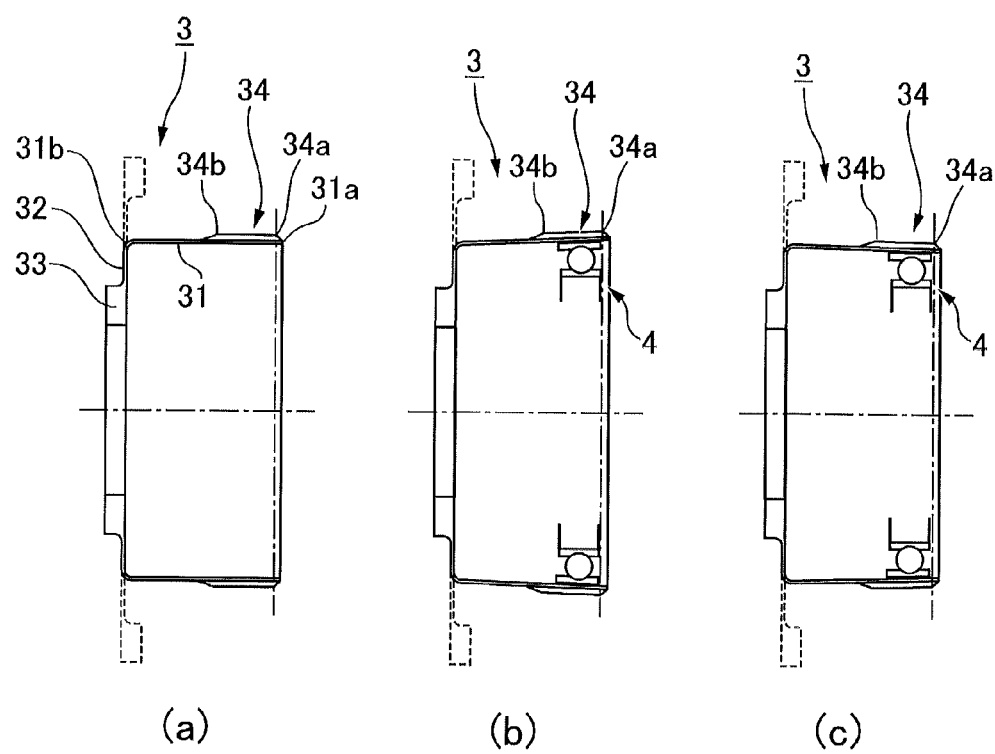
FIG. 2 is a descriptive diagram showing conditions of flexure of a flexible external gear, (a) showing a state prior to deformation, (b) showing a state in a cross section including the major axis of a flexible external gear when deformed to ellipsoidal shape, and (c) showing a state in a cross section including the minor axis of a flexible external gear when deformed to ellipsoidal shape.

FIG. 1 is a front view of a wave gear device to which the present invention is directed. The cross sectional views in FIG. 2 show, in axis-including cross section, a condition in which the opening of the flexible external gear thereof is flexed into ellipsoidal shape, wherein FIG. 2(a) shows a state prior to deformation, FIG. 2(b) shows a cross section including the major axis of an ellipsoidal curve subsequent to deformation, and FIG. 2(c) shows a cross section including the minor axis of an ellipsoidal curve subsequent to deformation, respectively. In FIG. 2(a) to (c), the solid lines indicate a flexible external gear of cup shape, and the broken lines show a flexible external gear of silk hat shape.

As shown in these drawings, the wave gear device 1 has a ring-shaped rigid internal gear 2, a flexible external gear 3 disposed to the inside thereof, and a wave generator 4 of ellipsoidal contours fitting inside thereof. The rigid internal gear 2 and the flexible external gear 3 are both spur gears of module m. The difference in number of teeth between the two gears is 2n (n is a positive integer), with the rigid internal gear 2 having the greater number. The flexible external gear 3 is flexed into ellipsoidal shape by the wave generator 4 of ellipsoidal contours, and meshes with the rigid internal gear 2 in sections at either end of the ellipsoidal shape in the major axis L1 direction. As the wave generator 4 rotates, the locations at which the two gears 2, 3 mesh move in a circumferential direction, generating between the two gears 2, 3 relative rotation according to the difference in number of teeth between the two gears. The flexible external gear 3 is provided with a flexible cylindrical barrel part 31, a diaphragm 32 continuing on from the rear end 31b thereof and spreading out in a radial direction, a boss 33 continuing on from the diaphragm 32, and external teeth 34 formed on an outside peripheral surface section at an opening 31a side of the cylindrical barrel part 31.

Due to the wave generator 4 of ellipsoidal contours fitting within an inside peripheral surface section of the external tooth formation section of the cylindrical barrel part 31, the cylindrical barrel part 31 experiences a progressively increasing amount of flexure towards the outside or towards the inside in a radial direction, towards the opening end 31a from a rear end 31b on the diaphragm side. As shown in FIG. 2(b), in a cross section that includes the major axis L1 of the ellipsoidal shape, the amount of flexure towards the outside progressively increases in proportion to the distance from the rear end 31b to the opening end 31a; and as shown in FIG. 2(c), in a cross section that includes the minor axis L2 of the ellipsoidal shape, the amount of flexure towards the inside progressively increases in proportion to the distance from the rear end 31b to the opening end 31a. Consequently, the external teeth 34 formed on the outside peripheral surface section at the opening end 31a side likewise experience varying amounts of flexure in axis-perpendicular cross sections in the tooth trace direction thereof. Specifically, the amount of flexure progressively increases, in a manner proportional to the distance from the rear end 31b, from the location of the inner end 34b on the diaphragm side towards the location of the opening end 34a on the opening side in the tooth trace direction of the external teeth 34.

(Tooth Profile Shape of Both Gears)

Figure 3:
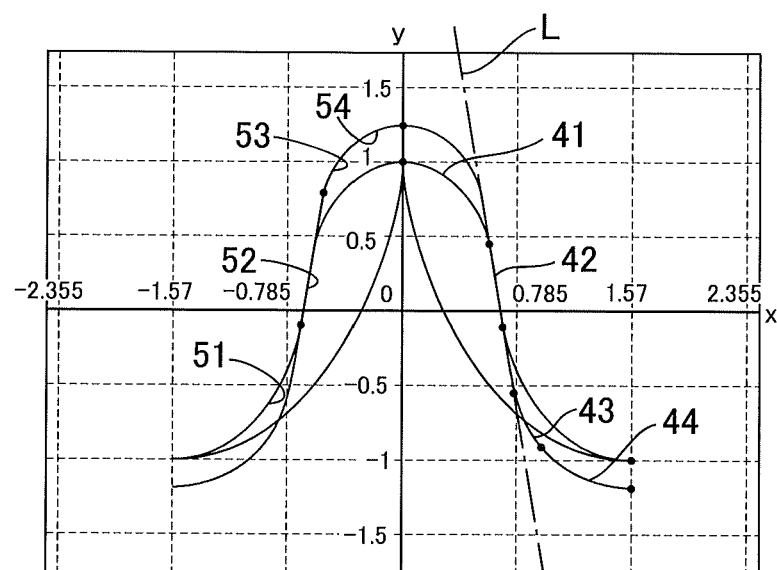
FIG. 3 is a descriptive diagram showing an example of the tooth profiles of both gears in an axis-perpendicular cross section (principal cross section) of the opening end of external teeth.
Figure 4:
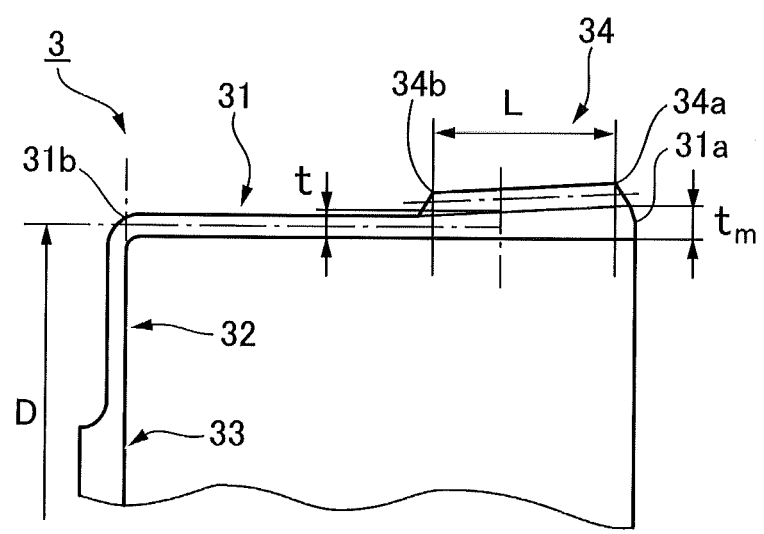
FIG. 4 is a descriptive diagram showing a tooth profile shape in the tooth trace direction of external teeth to which tooth profile shifting has been applied.

FIG. 3 is a descriptive diagram showing an example of the tooth profiles of both gears 2, 3; and FIG. 4 is a descriptive diagram showing a tooth profile contour shape in the tooth trace direction of the flexible external gear 3. The tooth profile shape of the external teeth 34 shown in FIG. 3 is that at the location of the opening end 34a (principal cross section) thereof, and the tooth profile shape in a section extending from the opening end 34a to the inner end 34b of the external teeth 34 is a shifted tooth profile shape obtained by applying minus tooth profile shifting to the tooth profile shape shown in FIG. 3, in the manner discussed below. As a result, as shown in FIG. 4, the flexible external gear 3 is a tapered flexible external gear in which the diameter of the addendum circle becomes progressively smaller from the opening end 34a towards the inner end 34b along the tooth trace direction. In contrast to this, the tooth profile shape of the inner teeth 24 is unchanging along the entire tooth trace direction, and is established to have the tooth profile shape shown in FIG. 3.

As shown in FIG. 3, the tooth profile shape at the opening end 34a (principal cross section) of the external teeth 34 is defined by an external tooth addendum tooth profile section 41 of convex curving shape, an external tooth linear tooth profile section 42 continuous therewith, an external tooth dedendum tooth profile section 43 of concave curving shape continuous therewith, and an external tooth root section 44 continuous therewith. The tooth profile shape of the internal teeth 24 is defined by an internal tooth addendum tooth profile section 51 of convex curving shape, an internal tooth linear tooth profile section 52 continuous therewith, an internal tooth dedendum tooth profile section 53 of concave curving shape continuous therewith, and an internal tooth root section 54 continuous therewith.

(Method of Forming Tooth Profiles of Both Gears)

Next, the method of forming the tooth profiles of the external teeth 34 and the internal teeth 24 will be described making reference to FIG. 3, FIG. 5, and FIG. 6.

(Movement Loci of Teeth Through Rack Approximation)

Figure 5:
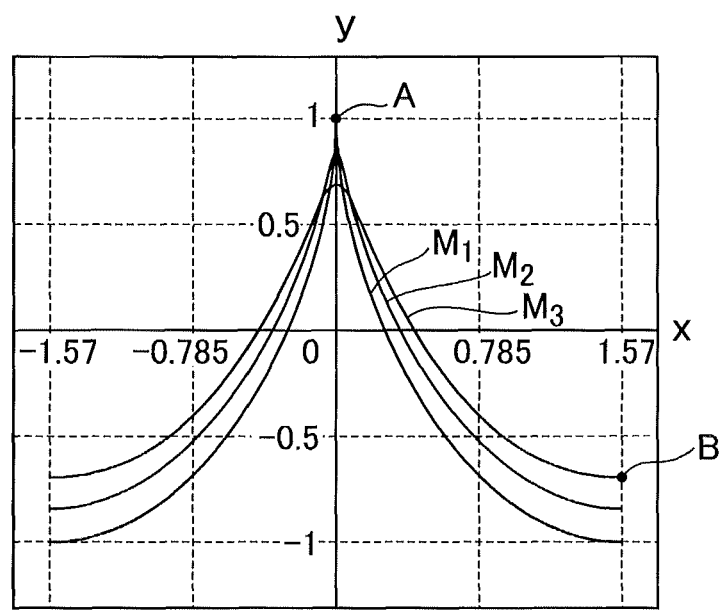
FIG. 5 is a descriptive diagram showing movement loci of external teeth with respect to internal teeth, obtained through rack approximation of the relative motion of a flexible external gear and a rigid internal gear, in axis-perpendicular cross sections at an opening end location, a medial location, and an inner end location in the tooth trace direction of the external teeth of a flexible external gear.

FIG. 5 is a diagram showing movement loci of the external teeth 34 of the flexible external gear 3 with respect to the internal teeth 24 of the rigid internal gear 2, obtained through rack approximation of the relative motion of the two gears 2, 3. In the drawing, the x axis is the translation direction of the rack, and the y axis shows a direction perpendicular thereto. Here, in an axis-perpendicular cross section at any location in the tooth trace direction of the external teeth 34 of the flexible external gear 3, the amount of flexure by the external tooth 34 in question at the major axis location L1 in an ellipsoidal rim neutral line with respect to the rim neutral line prior to flexure of the external tooth 34 in question into ellipsoidal shape, is 2 κmn, where κ is the flexural coefficient. Movement loci of the external teeth 34 of the flexible external gear 3 are given by equation 1.

$$x=0.5\ mn(\theta-\kappa \sin \theta)$$

$$y=\kappa mn \cos \theta$$

Assuming, for simplicity of description, that m=1 and n=1 (the tooth count differential is 2), the movement locus is as described by the following equation.

$$x=0.5(\theta-\kappa \sin \theta)$$

$$y=\kappa \cos \theta$$

The origin of the y axis in FIG. 5 is the average position of amplitude of the movement loci. Of the movement loci, the standard-deflecting movement locus $M_1$ is one obtained in a benchmark, standard deflecting flexural state in which the flexural coefficient $\kappa=1$, while the negative deflecting movement loci $M_2$, $M_3$ are ones obtained in a negative deflecting flexural state in which the flexural coefficient $\kappa<1$. In the present invention, the principal cross section serving as the foundation for formation of the tooth profile of the two gears 2, 3 is an axis-perpendicular cross section at the location of the opening end 34a in the tooth trace direction of the external teeth 34 of the flexible external gear 3. The negative deflecting movement locus $M_2$ is a locus obtained in an axis-perpendicular cross section at a medial location in the tooth trace direction of the external teeth 34, and the negative deflecting movement locus $M_3$ is a locus obtained at the location of the inner end 34b in the tooth trace direction of the external teeth 34. In FIG. 5, the movement locus $M_2$ is one obtained at flexural coefficient $\kappa=0.85$, and the movement locus $M_3$ is one obtained at flexural coefficient $\kappa=0.7$.

(Method of Forming Tooth Profile in Principal Cross Section)

Figure 6:
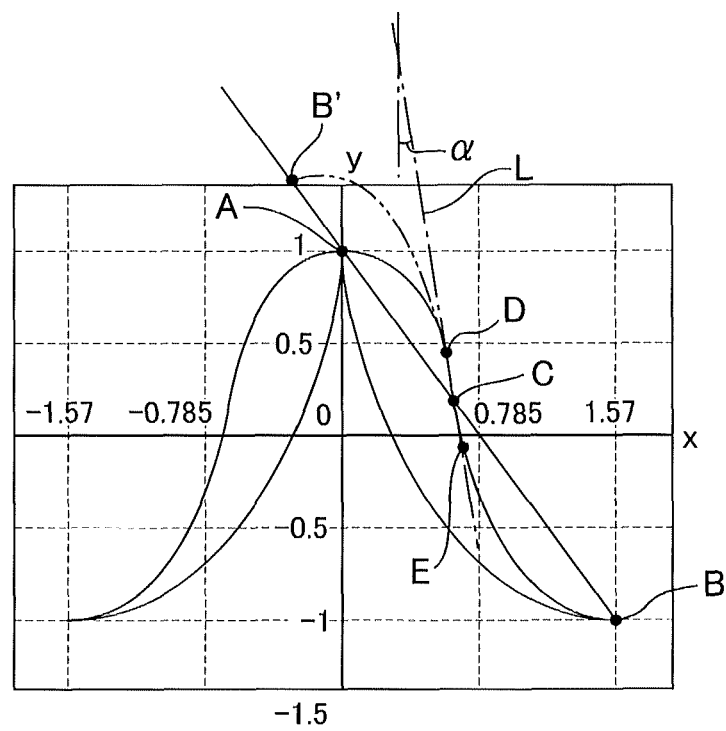
FIG. 6 is a descriptive diagram showing a procedure for deriving respective tooth profiles for both gears, from movement loci in a principal cross section (standard-deflecting cross section) of the external teeth of a flexible external gear.

FIG. 6 is a descriptive diagram showing a utilization range of the standard deflecting movement locus $M_1$, employed in forming the tooth profiles of the external teeth 34 and the inner teeth 24. In the drawing, the parameter $\theta$ of the standard deflecting movement locus $M_1$ of the principal cross section (the cross section of the opening end 34a) has a range from $\pi$ (point B: the bottom portion of the movement locus) to 0 (point A: the apical portion of the movement locus), and with point B as the homothetic center, the standard deflecting movement locus $M_1$ undergoes homothetic transformation by a ratio $\lambda$ ($\lambda<1$), to obtain a first homothetic curve BC. FIG. 6 shows a case in which $\lambda=0.6$. The first homothetic curve BC is adopted as the tooth profile curve employed for defining the addendum tooth profile of the rigid internal gear 2.

The first homothetic curve BC is then rotated by 180 degrees about the end point C of the first homothetic curve BC, to obtain a curve B'C. A second homothetic curve AC is obtained through transformation of this curve B'C at a ratio $(1-\lambda)/\lambda$ at a homothetic center at the end point C. The second homothetic curve AC is adopted as the tooth profile curve employed for defining the addendum tooth profile of the flexible external gear 3.

The tooth profile curves for defining these addendum tooth profiles are expressed by the following equations.

Basic equation for addendum tooth profile of rigid internal gear:

$$x_{Ca}=0.5\{(1-\lambda)\pi+\lambda(\theta-\sin \theta)\}$$

$$y_{Ca}=\lambda(1+\cos \theta)\} \ (0\leq\theta\leq\pi)$$

Basic equation for addendum tooth profile of flexible external gear:

$$x_{Fa}=0.5(1-\lambda)(\pi-\theta+\sin \theta)\}$$

$$y_{Fa}=(1-\lambda)(1+\cos \theta)\} \ (0\leq\theta\leq\pi)$$

(Tooth Profile Shape of Principal Cross Section of External Teeth)

The tooth profile curve AC for defining the addendum tooth profile, derived in the aforedescribed manner, is employed in forming an external tooth tooth profile in the principal cross section (an axis-perpendicular cross section of the opening end 34a) of the external teeth 34 in the following manner. To describe with reference to FIG. 3 and FIG. 6, a straight line L is drawn to intersect, at a pressure angle $\alpha$, the tooth profile curve AC for defining the addendum tooth profile of the flexible external gear 3, and a curve segment AD lying between the end point A of the tooth profile curve AC and an intersection point D with the straight line L is derived. Adopting this curve segment AD as the tooth profile curve defining a normal addendum tooth profile, the tooth profile curve in question is employed to form the external tooth addendum tooth profile section 41. The external tooth linear tooth profile section 42 is defined by a line segment of the straight line L extending from the intersection point D. Further, the external tooth deddendum tooth profile section 43 is defined by a predetermined convex curve connecting between the external tooth linear tooth profile section 42 and the external tooth root section 44 which is defined by a predetermined external tooth root curve, doing so in such a way as to ensure predetermined radial clearance of the external tooth linear tooth profile section 42 with respect to the internal teeth 24.

(Tooth Profile Shape of Internal Teeth)

Likewise, the tooth profile curve BC employed for defining the addendum tooth profile is employed to form the tooth profile of the internal teeth 24. To describe with reference to FIG. 3 and FIG. 6, a straight line L is drawn to intersect, at a pressure angle $\alpha$, the tooth profile curve BC for defining the addendum tooth profile of the rigid internal gear 2, and a curve segment BE lying between the end point B of the tooth profile curve BC and an intersection point E with the straight line L is derived. Adopting this curve segment BE as the tooth profile curve defining a normal addendum tooth profile, the tooth profile curve in question is employed to form the internal tooth addendum tooth profile section 51. The internal tooth linear tooth profile section 52 is defined by a line segment of the straight line L extending from the intersection point E. Further, the internal tooth deddendum tooth profile section 53 is defined by a predetermined convex curve connecting the internal tooth linear tooth profile section 52 and the internal tooth root section 54 which is defined by a predetermined external tooth root curve, doing so in such a way as to ensure predetermined radial clearance of the internal tooth linear tooth profile section 52 with respect to the external teeth 34.

The tooth profile sections 43, 44, 53, 54 of the deddendums of the two gears do not participate in meshing. Consequently, these dedendum tooth profile sections 43, 44, 53, 54 can be designed freely, provided that there is no interference with the respective corresponding addendum tooth profile sections 51, 52, 41, 42.

In this way, tooth profile shapes are formed at locations of principal cross sections (axis-perpendicular cross sections of the opening end 34a of the external teeth 34) in both of the gears 2, 3 shown in FIG. 3. In the present example, the pressure angle of the linear tooth profile $\alpha$ is 9 degrees. From the standpoint of machining of the gears, it is preferable to avoid sections in which the pressure angle of the addendum tooth profile is close to zero, and to connect the linear tooth profiles to the deddendum tooth profiles from points of a pressure angle of close to 6 degrees to 10 degrees.

(Tooth Profile Shape at Locations Other than Principal Cross Section in External Teeth)

With regard to meshing of the tooth profiles of the principal cross section established in the aforedescribed manner, during intermeshing of the addendum tooth profiles of the two gears 2, 3, when the flexible external gear 3 moves along the standard deflecting movement locus $M_1$ shown in FIG. 5 with respect to the rigid internal gear 2, the addendum tooth profiles come into continuous contact due to the nature of the homothetic curve. In contrast to this, in axis-perpendicular cross sections lying towards the diaphragm side from the principal cross section in the external teeth 34, the deflection coefficient κ<1. As shown in FIG. 5, the negative deflecting movement loci $M_2$, $M_3$ interfere with the non-deflecting movement locus $M_1$, and for as long as this persists, continuous intermeshing of the addendum tooth profiles, such as that taking place in the case of the principal cross section, cannot be sustained.

Accordingly, a shifted tooth profile in which a tooth profile shifting is applied to the tooth profile of the principal cross section (the axis-perpendicular cross section of the opening end 34*a*) is adopted as the external tooth tooth profile of axis-perpendicular cross sections in a section extending from the opening end 34*a* to the inner end 34*b* in the external teeth 34. Specifically, the shifted tooth profile shapes are obtained by applying minus tooth profile shifting to the external-tooth tooth profile of the opening end 34*a*, doing in such a way that movement loci obtained through rack approximation of the external teeth 34 with respect to the internal teeth 24 in axis-perpendicular cross sections from the opening end 34*a* to the inner end 34*b* contact the bottom portion B of the movement locus $M_1$ obtained at the opening end 34*a* constituting the principal cross section location. In so doing, proper meshing in at least localized fashion can be ensured on all cross sections in the tooth trace direction of the external teeth 34.

To discuss in more specific terms, in each of axis-perpendicular cross sections taken towards the location of the inner end 34*b* on the diaphragm side from the opening end 34*a* of the external teeth 34, an amount of addendum modification mnh is established according to the flexural coefficient κ at each of the axis-perpendicular cross section locations, doing so in such a way that the movement locus in each axis-perpendicular cross section contacts the bottom part B of the movement locus $M_1$ at the opening end 34*a*. In a case in which m=1 and n=1, the amount of addendum modification (tooth profile shifting) is h, and assumes a negative value represented by the following expression.

$$h = \kappa - 1$$

Through application of tooth profile shifting in this manner, the root rim thickness t in each axis-perpendicular cross section in the tooth trace direction of the external teeth 34 is $$t = \kappa t_1$$

Here, $t_1$: root rim thickness in principal cross section (axis-perpendicular cross section at the opening end).

(Method of Establishing Root Rim Thickness of External Teeth and Amount of Addendum Modification of Teeth)

Figure 7:
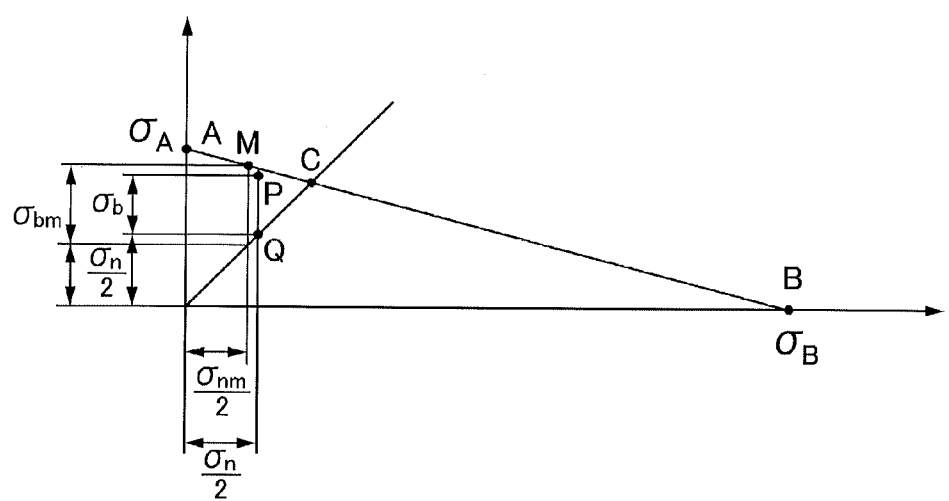
FIG. 7 is a descriptive diagram showing a procedure employing a modified Goodman diagram to determine the root rim thickness of a flexible external gear.

FIG. 7 shows the procedure of the present invention in which a so-called modified Goodman diagram is employed to determine the root rim thickness of a flexible external gear, and amounts of addendum modification for the teeth. In the wave gear device 1, where $\sigma_b$ is the tensile stress associated with bending of the root rim surface on the major axis in association with deformation of the flexible external gear 3 to ellipsoidal shape, $\sigma_b$ is defined by the following expression, taken from a basic formula of material mechanics.

$$\sigma_b = 3Et/(RD)$$

Here, E: Young's modulus
t: root rim thickness
R: reduction ratio
D: diameter of rim neutral circle prior to deformation Additionally, where $\sigma_n$ is the tensile stress arising on the major axis due to output torque T, the surface area of the root receiving the load is DL, and therefore $\sigma_n$ is defined by the following expression.

$$\sigma_n = T/(DLt)$$

Here, L: tooth width of flexible external gear

Consequently, the stress arising on the major axis of the flexible external gear 3 is the sum of $\sigma_b$ and $\sigma_n$, and the stress arising at the root rim surface on the minor axis of the flexible external gear 3 is compressive stress $-\sigma_b$. Thus, stress amplitude of the flexible external gear 3 arising due to rotation of the wave generator 4 is:

$$((\sigma_b+\sigma_n)-(-\sigma_b))/2 = \sigma_b + \sigma_n/2$$

and average stress is:

$$((\sigma_b+\sigma_n)+(-\sigma_b))/2 = \sigma_n/2,$$

On the same plane, a straight line is drawn connecting a point A (the vertical coordinate of which is $\sigma_A$) at which the substantial fatigue limit of alternating stress of the steel constituting the material of the flexible external gear 3 is plotted on the vertical axis, and a point B (the horizontal coordinate of which is $\sigma_B$) at which the center of yield stress and tensile strength of the steel is plotted on the horizontal axis, to create a so-called modified Goodman diagram. The triangular area bounded by this straight line, the horizontal axis, and the vertical axis is the permissible range of points produced by plotting the average stress of the root rim surface of the flexible external gear 3 on the horizontal axis, and the stress amplitude thereof on the vertical axis.

Here, in a case in which an ellipsoidal rim neutral curve of the flexible external gear 3 is given, a point P is derived by plotting, on the vertical axis, of the stress amplitude $(\sigma_b+\sigma_n/2)$ appearing at the root rim surface in the principal cross section (the axis-perpendicular cross section at the opening end 34*a*) arising due to rotation of the wave generator 4, and plotting, on the horizontal axis, of the average stress $\sigma_n/2$. In the first instance, it is necessary for this point P to be included within the aforedescribed triangular area.

At this time, the transmission load torque T transmitted by the flexible external gear 3 is proportional to the product of the root rim thickness t and the tensile stress $\sigma_n$. The root rim thickness t is proportional to the tensile stress $\sigma_b$ in association with bending. Consequently, the torque T of the flexible external gear is proportional to the product of the tensile stress $\sigma_b$ and the tensile stress $\sigma_n$. Here, $\sigma_b$ is represented by a line segment PQ, where Q designates the intersection point of a straight line parallel to the vertical axis and passing through point P, and a straight line forming a 45 degree angle to the horizontal axis and passing through the origin. From the above, the torque T is proportional to the area of an oblong shape bounded by straight lines parallel to the horizontal axis and passing respectively through point P and point Q to the vertical axis, and the line segment PQ.

Consequently, the point at which the torque transmitted by the flexible external gear 3 of given specifications reaches maximum is the midpoint M of a line segment AC, where C is the intersection point of the modified Goodman diagram and a straight line passing through the origin and forming a 45 angle to the horizontal axis, and the root rim thickness corresponding to the midpoint M is the optimal value. Consequently, in this case, from the geometric relationships in the diagram:

$$\sigma_b = \sigma_A/2$$

$$\sigma_n = \sigma_A \sigma_B/(\sigma_A + \sigma_B)$$

The optimal value $t_m$ of root rim thickness $t_1$ in the principal cross section (location of the opening end 34a) of the external teeth is given by the following expression.

$$t_1 = t_m = \sigma_A RD/(6E)$$

As stated above, when minus tooth profile shifting is applied to the external teeth 34, and the root rim thickness thereof is designated as the root rim thickness $t_1$ at the location of the opening end 34a in the tooth trace direction of the external teeth 34, the root rim thickness at locations other than the opening end 34a is $\kappa t_1$. Consequently, when the root rim thickness $t_1$ at the opening end 34a is set to the optimal rim thickness $t_m$ in the aforedescribed manner, the root rim thickness t in each of axis-perpendicular cross sections taken from the opening end 34a to the inner end 34b of the external teeth 34 is set to $\kappa t_m$.

In other words, the rim thickness of the flexible external gear is determined in such a fashion as to take progressively smaller values, in such a way that points corresponding to root rim thickness of axis-perpendicular cross sections lying in the tooth trace direction from the opening end 34a to the inner end 34b of the external teeth 34 are plotted to the right side of the midpoint M in the modified Goodman diagram. During this process, it is necessary for the coordinate points representing stress amplitude and average stress on the modified Goodman diagram to lie within the permissible range mentioned earlier.

In the present invention, as shown below, the condition in question is met, and the coordinate points of the modified Goodman diagram representing the stress state of the flexible external gear 3 lie in the triangular area constituting the permissible range in the diagram in question.

Specifically, with regard to the root rim thickness of axis-perpendicular cross sections from the opening end 34a to the inner end 34b, when the root rim thickness of the opening end 34a of the flexible external gear has been assigned the optimal value $t_m$, in order to sustain meshing of the tooth profiles along the tooth trace, the root rim thickness is set to $\kappa t_m$, which is equivalent to applying tooth profile shifting of a coefficient $1-\kappa$ ($\kappa<1$) to the teeth, doing so in such a way that the bottom portions of the movement loci of the external teeth 34 of the flexible external gear 3 to the internal teeth 24 of the rigid internal gear 2 in each of the axis-perpendicular cross sections are made congruent. At this time, according to the decrease in the rim thickness, the tensile stress of the rim at any location increases in the manner $\sigma_{nm}/\kappa$, with respect to the tensile stress $\sigma_{nm}$ of the opening end 34a due to torque.

Meanwhile, bending stress $\sigma_b$ arising on the major axis in any cross section of the flexible external gear is proportional to the product of the rim thickness $\kappa t_m$ and the amount of flexure w. Where the value of bending stress with respect to $t_m$ is designated as $\sigma_{bm}$, $$\sigma_b = \kappa^2 \sigma_{bm} = \kappa^2 \sigma_A/2.$$

From the equation for a straight line, the vertical coordinate corresponding to the horizontal coordinate of average stress $\sigma_{nm}/\kappa/2$ on the modified Goodman diagram is:

$$-(\sigma_A/\sigma_B)\sigma_{nm}/2/\kappa + \sigma_A$$

Here, employing the relationship $\sigma_{bm} = \sigma_A/2$, in the axis-perpendicular cross section of the opening end 34a, from the relationship:

$$(\sigma_B - \sigma_{nm}/2)(\sigma_A/\sigma_B) = \sigma_{bm} + \sigma_{nm}/2 = \sigma_A/2 + \sigma_{nm}/2$$

the following result is obtained.

$$\sigma_{nm} = \sigma_A \sigma_B/(\sigma_A + \sigma_B)$$

Consequently, the vertical coordinate of a modified Goodman straight line corresponding to the average stress $\sigma_{nm}/\kappa/2$ of a cross section of coordinate $\kappa$ is given by the following expression.

$$-\frac{\sigma_A \sigma_B}{2\kappa(\sigma_A + \sigma_B)} \frac{\sigma_A}{\sigma_B} + \sigma_A = \sigma_A \left(1 - \frac{\sigma_A}{2\kappa(\sigma_A + \sigma_B)}\right) \quad \text{[Expression 1]}$$

In contrast to this, the stress amplitude of a cross section of coordinate $\kappa$ is:

$$\frac{\sigma_{nm}}{2\kappa} + \kappa^2 \sigma_{bm} = \quad \text{[Expression 2]}$$

$$\frac{\sigma_A \sigma_B}{2\kappa(\sigma_A + \sigma_B)} + \kappa^2 \frac{\sigma_A}{2} = \sigma_A \left(\frac{\sigma_B}{2\kappa(\sigma_A + \sigma_B)} + \frac{\kappa^2}{2}\right)$$

The difference of the two is:

$$\sigma_A \left(1 - \frac{\kappa^2}{2} - \frac{1}{2\kappa}\right) \quad \text{[Expression 3]}$$

and this value is positive with respect to the range of actual values of $\kappa$ (in the present example, from 1 to 0.7), thereby showing that the coordinate values with respect to the rim thickness $\kappa t$ lie within the permissible range.

(State of Meshing of Teeth)

Figure 8:
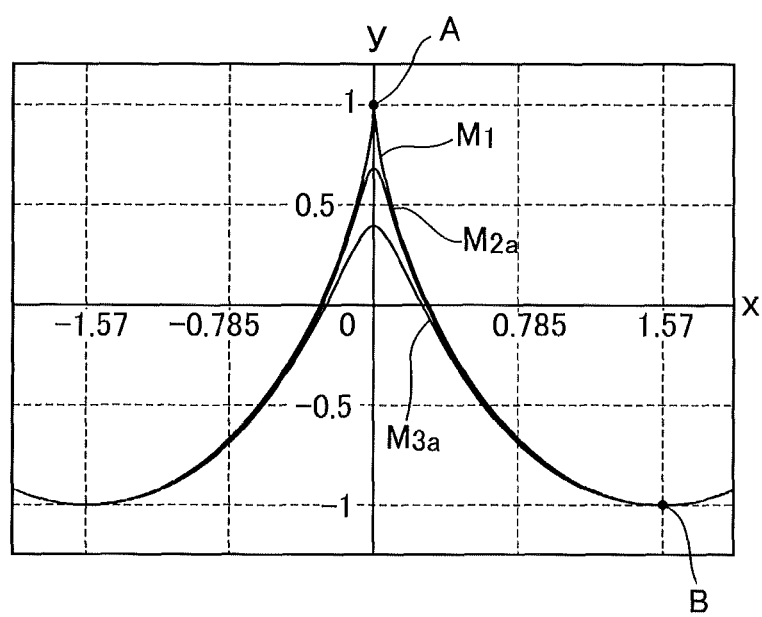
FIG. 8 is a descriptive diagram showing three movement loci, for a principal cross section of the tooth profile of a flexible external gear to which tooth profile shifting has been applied, and for cross sections to the front and back thereof.

FIG. 8 is a graph showing movement loci of external teeth on axis-perpendicular cross sections at the opening end 34a (principal cross section), and at a medial location and at the inner end 34b in the tooth trace direction, in the external teeth 34 for which the tooth profile has been established in the aforedescribed manner. The movement loci $M_{2a}$, $M_{3a}$ of the shifted tooth profiles at the medial location and at the inner end 34b contact the movement locus $M_1$ at the opening end 34a in the bottom portion B, the shapes of the loci being mutually homothetic, with the exception of portions of the apical portions. This shows that, with the tooth profile of the present invention, it is possible to obtain a state of meshing over the entirety of the tooth trace, with the exception of portions of the apical portions.

Figure 9A:
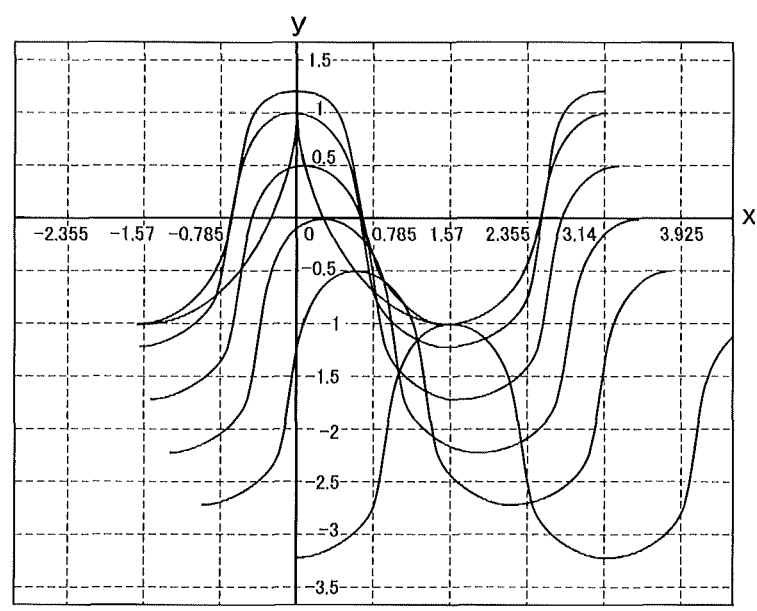
FIG. 9A is a descriptive diagram showing conditions of meshing in a cross section (standard-deflecting cross section) at an opening end location of external teeth in the tooth trace direction of the tooth profile of both gears.
Figure 9B:
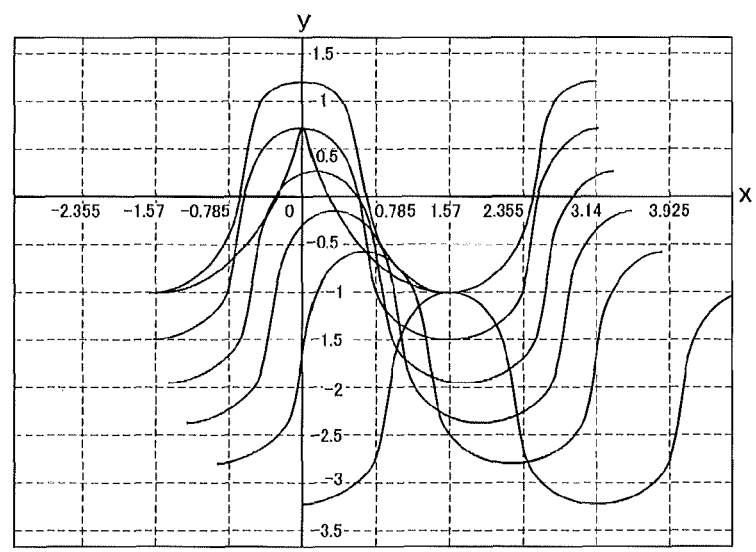
FIG. 9B is a descriptive diagram showing conditions of meshing in a cross section (negative-deflecting cross section) at a medial location of external teeth in the tooth trace direction of the tooth profile of both gears.
Figure 9C:
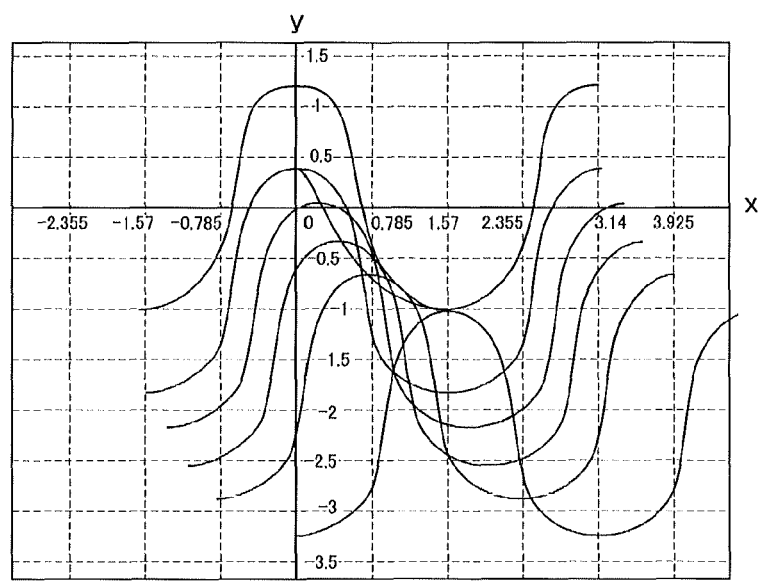
FIG. 9C is a descriptive diagram showing the conditions of meshing in a cross section (negative-deflecting cross section) at an inner end location of external teeth in the tooth trace direction of the tooth profile of both gears.

Next, FIG. 9A to FIG. 9C are descriptive diagrams showing, through rack approximation, the condition of meshing of external teeth and internal teeth for which tooth profiles have been established in the aforedescribed manner. FIG. 9A shows that obtained at the opening end location of the external teeth, FIG. 9B that at a medial location in the tooth trace direction of the external teeth, and FIG. 9C that at the inner end location of the external teeth. The movement loci at each location in the tooth trace direction of the external teeth have good congruence in sections leading to the bottom portions thereof, whereby it may be appreciated that a state of meshing of the external teeth and the internal teeth is obtained over the entirety of the tooth trace.

The invention claimed is:

1. A wave gear device, comprising:
   a rigid internal gear of annular shape;
   a flexible external gear disposed coaxially to an inside thereof; and
   a wave generator fitted to an inside thereof;
   the flexible external gear being provided with a flexible cylindrical barrel part, a diaphragm radially extending from a rear end of the cylindrical barrel part, and external teeth formed on an outside peripheral surface part at a front end opening side of the cylindrical barrel part;
   the external teeth of the flexible external gear being flexed into ellipsoidal shape by the wave generator, and meshing with internal teeth of the rigid internal gear at both ends in a major axis direction of an ellipsoidal curve thereof;
   the external teeth of the flexible external gear flexed into ellipsoidal shape having increasing amounts of flexure, substantially proportional to a distance from the diaphragm, from a diaphragm side towards a front end opening side along a tooth trace direction thereof;
   the external teeth of the flexible external gear and the internal teeth of the rigid internal gear both being spur gears of module m;
   a number of teeth of the flexible external gear being set to 2n fewer than a number of teeth of the rigid internal gear, where n is a positive integer;
   in an axis-perpendicular cross section at any location in the tooth trace direction of the external gear, an amount of flexure in a radial direction by the external teeth at a major axis location in an ellipsoidal rim neutral line, with respect to a rim neutral line prior to flexure of the external teeth into ellipsoidal shape, being 2 $\kappa$mn, where $\kappa$ is a flexural coefficient;
   the flexural coefficient of an opening end cross section being $\kappa=1$ when, in the tooth trace direction of the external teeth of the flexible external gear, an axis-perpendicular cross section at an end on the front end opening side is designated as an opening end cross section, and an axis-perpendicular cross section at an end on the diaphragm side as an inner end cross section;
   an opening end tooth profile shape in the opening end cross section of the external teeth being defined by an external tooth addendum tooth profile section of convex curving shape, an external tooth linear tooth profile section continuous therewith, an external tooth deddendum tooth profile section of concave curving shape continuous therewith, and an external tooth root section continuous therewith;
   a tooth profile shape of a section of the external teeth extending from the opening end cross section to the inner end cross section being a shifted tooth profile shape in which minus tooth profile shifting is applied to the opening end tooth profile shape, in order to avoid interference with the internal teeth;
   a tooth profile shape of the internal teeth in an axis-perpendicular cross section being defined by an internal tooth addendum tooth profile section of convex curving shape, an internal tooth linear tooth profile section continuous therewith, an internal tooth deddendum tooth profile section of concave curving shape continuous therewith, and an internal tooth root section continuous therewith;
   meshing of the external teeth and the internal teeth being approximated by rack meshing, and movement loci of the external teeth of the flexible external gear with respect to the internal teeth of the rigid internal gear in association with rotation of the wave generator being derived in axis-perpendicular cross sections taken in the tooth trace direction of the external teeth;
   a first homothetic curve (BC) being derived by homothetic transformation by a ratio $\lambda$ at a homothetic center at a point (B), the homothetic ratio being $\lambda<1$, of a curve segment (AB) extending from a point (A) of an apical portion in the movement locus ($M_1$) obtained in the opening end cross section, to the point (B) in a next bottom portion;
   a second homothetic curve (CA) being derived through homothetic transformation, by a ratio $(1-\lambda)/\lambda$ at a homothetic center at an end point (C), of a curve (B'C) obtained by rotating the first homothetic curve (BC) by 180 degrees about the end point (C) of the first homothetic curve (BC);
   a straight line (L) being drawn to intersect the curve (CA) at a pressure angle $\alpha$, and a curve segment (AD) being derived between the end point (A) of the curve (CA) and an intersection point (D) with the straight line (L);
   the external tooth addendum tooth profile section being defined by the curve segment (AD);
   the external tooth linear tooth profile section being defined by a linear segment extending from the intersection point (D) in the straight line (L);
   the external tooth deddendum tooth profile section being defined by a concave curve connecting the external tooth linear tooth profile section and the external tooth root section which is defined by a predetermined external tooth root curve, so as to ensure a predetermined radial clearance of the external tooth linear tooth profile section with respect to the internal teeth;
   a straight line (L) being drawn to intersect the first homothetic curve (BC) at the pressure angle $\alpha$, and a curve segment (BE) being derived between the end point (B) in the first homothetic curve (BC) and an intersection point (E) with the straight line (L);
   the internal tooth addendum tooth profile being defined by the curve segment (BE);
   the internal tooth linear tooth profile section being defined by a linear segment extending from the intersection point (C) in the straight line (L);
   on a same plane, a straight line being drawn to connect a point (A) at which a fatigue limit of alternating stress of steel constituting a material of the flexible external gear is plotted on a vertical axis, and a point (B) at which a central value of yield stress and tensile strength of the steel is plotted on a horizontal axis, to create a modified Goodman diagram;
   root rim thickness $t_m$ of the opening end cross section of the flexible external gear being determined in such a way that the location of the coordinate points obtained by plotting, on the vertical axis, of stress amplitude expressed as the sum of bending stress produced by flexure on the major axis appearing on the surface of the root rim at the opening end of the flexible external gear in association with ellipsoidal deformation thereof and ½ of the tensile stress arising at the root rim due to load torque, and plotting, on the horizontal axis, of the average stress of ½ of the tensile stress, lies on the midpoint (M) of the line segment (AC) obtained by designating as (C) the intersection point of the straight line (AB) and the straight line passing through the origin at 45 degree angle to the horizontal axis in the modified Goodman diagram; and at individual locations from the opening end to the inner end of the external teeth, root rim thickness in each axis-perpendicular cross section being determined in such a way that the location of coordinate points obtained by plotting, on the vertical axis, of stress amplitude expressed as the sum of bending stress produced by flexure and ½ the tensile stress arising at the root rim at the location in question due to transmission load torque, and plotting, on the horizontal axis, of the average stress of ½ of the tensile stress in question, lies to the right side of the midpoint (M) on the modified Goodman diagram.

2. The wave gear device according to claim 1, wherein the root rim thickness t in axis-perpendicular cross sections taken at locations from the opening end to the inner end of the external teeth is $t = \kappa t_m$.

3. The wave gear device according to claim 1, wherein the shifted tooth profile shape of the section from the opening end cross section to the inner end cross section in the external teeth is one to which minus tooth profile shifting is applied to the opening end tooth profile shape, in such a way that the movement locus obtained in individual axis-perpendicular cross sections from the opening end cross section to the inner end cross section contacts the movement locus obtained in the opening end cross section, at a point in bottom portions thereof.

4. The wave gear device according to claim 2, wherein the shifted tooth profile shape of the section from the opening end cross section to the inner end cross section in the external teeth is one to which minus tooth profile shifting is applied to the opening end tooth profile shape, in such a way that the movement locus obtained in individual axis-perpendicular cross sections from the opening end cross section to the inner end cross section contacts the movement locus obtained in the opening end cross section, at a point in bottom portions thereof.

* * * * *